United States Patent
Matsui et al.

(10) Patent No.: US 10,319,303 B2
(45) Date of Patent: Jun. 11, 2019

(54) DISPLAY DEVICE FOR DECREASING CAPACITANCE VOLTAGE DEPENDENCE

(71) Applicant: JOLED INC., Tokyo (JP)

(72) Inventors: Masafumi Matsui, Tokyo (JP); Hitoshi Tsuge, Tokyo (JP); Kohei Ebisuno, Tokyo (JP)

(73) Assignee: JOLED INC., Tokyo (JP)

( * ) Notice: Subject to any disclaimer, the term of this patent is extended or adjusted under 35 U.S.C. 154(b) by 95 days.

(21) Appl. No.: 15/471,067

(22) Filed: Mar. 28, 2017

(65) Prior Publication Data
US 2017/0287401 A1 Oct. 5, 2017

(30) Foreign Application Priority Data
Mar. 30, 2016 (JP) ................................. 2016-069214

(51) Int. Cl.
*G09G 5/10* (2006.01)
*G09G 3/3258* (2016.01)

(52) U.S. Cl.
CPC ... *G09G 3/3258* (2013.01); *G09G 2300/0819* (2013.01); *G09G 2320/0233* (2013.01); *G09G 2320/045* (2013.01); *G09G 2320/066* (2013.01)

(58) Field of Classification Search
CPC . G09G 2300/08119; G09G 2320/0233; G09G 2320/066; G09G 2320/045; G09G 3/3258; G09G 2300/0819
See application file for complete search history.

(56) References Cited

U.S. PATENT DOCUMENTS

| | | | | |
|---|---|---|---|---|
| 2006/0043375 | A1* | 3/2006 | Takasugi | G09G 3/3233 257/72 |
| 2006/0066527 | A1* | 3/2006 | Chou | G09G 3/3241 345/76 |
| 2006/0214890 | A1* | 9/2006 | Morishige | G09G 3/325 345/77 |
| 2008/0074412 | A1* | 3/2008 | Nozawa | G09G 3/3233 345/212 |

(Continued)

FOREIGN PATENT DOCUMENTS

| | | |
|---|---|---|
| JP | 2009-080367 | 4/2009 |
| JP | 2010-008522 | 1/2010 |

(Continued)

*Primary Examiner* — Insa Sadio
(74) *Attorney, Agent, or Firm* — Greenblum & Bernstein, P.L.C.

(57) ABSTRACT

A plurality of pixel circuits included in a display device each includes: a drive transistor; a capacitor connected to a gate electrode and a source electrode of the drive transistor; a light-emitting element which is driven by the drive transistor; a write transistor having a gate electrode connected to a write control line for transmitting a write signal, one of a drain electrode and a source electrode connected to a data line for transmitting a data voltage corresponding to luminance, and the other of the drain electrode and the source electrode connected to the gate electrode of the drive transistor; and a compensation transistor having a gate electrode connected to the data line, and at least one of a drain electrode and a source electrode connected to the write control line, the compensation transistor being of same conductivity type as the write transistor.

8 Claims, 13 Drawing Sheets

(56) References Cited

U.S. PATENT DOCUMENTS

| | | | | |
|---|---|---|---|---|
| 2013/0113690 A1* | 5/2013 | Ishii | ............... | G09G 3/003 |
| | | | | 345/77 |
| 2013/0120338 A1* | 5/2013 | Kubota | ............... | G06F 3/038 |
| | | | | 345/211 |
| 2014/0291685 A1* | 10/2014 | Kinoshita | ............... | H01L 27/3265 |
| | | | | 257/59 |
| 2015/0170569 A1* | 6/2015 | Han | ............... | G09G 3/3258 |
| | | | | 345/78 |
| 2015/0221253 A1 | 8/2015 | Yamamoto et al. | | |
| 2015/0364085 A1* | 12/2015 | Kanda | ............... | G09G 3/3233 |
| | | | | 345/214 |

FOREIGN PATENT DOCUMENTS

| | | |
|---|---|---|
| JP | 2010-266498 | 11/2010 |
| JP | 2011-215401 | 10/2011 |
| JP | 2014-048485 | 3/2014 |

\* cited by examiner

DISPLAY DEVICE FOR DECREASING CAPACITANCE VOLTAGE DEPENDENCE

CROSS REFERENCE TO RELATED APPLICATION

The present application is based on and claims priority of Japanese Patent Application No. 2016-069214 filed on Mar. 30, 2016. The entire disclosure of the above-identified application, including the specification, drawings and claims is incorporated herein by reference in its entirety.

FIELD

The present disclosure relates to a display device.

BACKGROUND

Display devices (hereinafter referred to as organic electroluminescent (EL) display devices) using organic EL elements are being brought into practical use. Generally, an organic EL display device includes (i) a display unit having, arranged in a matrix, pixel circuits each having an organic EL element, and (ii) a drive circuit for driving the display unit.

Conventionally, techniques for reducing luminance unevenness in organic EL display devices are known (for example, Patent Literature (PTL) 1).

PTL 1 discloses a pixel circuit that includes a first pixel switch (write transistor in this application) and a crosstalk cancel switch. The first pixel switch is configured of a transistor and has a gate electrode connected to a second scanning line (write control line in this application), a source electrode connected to a video signal line (data line in this application), and a drain electrode connected to a gate electrode of a drive transistor (drive transistor in this embodiment). The crosstalk cancel switch is configured of a transistor of a conductivity type different from the first pixel switch, and has a gate electrode connected to a second scanning line, and a source electrode and a gate electrode which are both connected to the video signal line.

In PTL 1, the crosstalk cancel switch makes it possible to reduce the capacitance change occurring in the second scanning line as a result of the parasitic capacitance difference generated in the first pixel switch being different according to the grayscale potential applied to the video signal line. Accordingly, the effect on the potential of the gate electrodes of the drive transistors of the plurality of pixel circuits connected to the second scanning line is reduced, which reduces the occurrence of lateral crosstalk.

CITATION LIST

Patent Literature

[PTL 1] Japanese Unexamined Patent Application Publication No. 2011-215401

SUMMARY

Technical Problem

However, since a crosstalk cancel switch having a conductivity type different from the first pixel switch is used in the display device in PTL 1, there is the concern that the manufacturing process will be complex.

In view of this, the present disclosure provides a display device capable of reducing luminance unevenness using a simpler configuration.

Solution to Problem

In order to achieve the aforementioned object, a display device according to an aspect of the present disclosure is a display device that includes a display unit including a plurality of pixel circuits, wherein each of the plurality of pixel circuits includes: a drive transistor; a capacitor connected to a gate electrode and a source electrode of the drive transistor; a light-emitting element which is driven by the drive transistor; a write transistor having a gate electrode connected to a write control line for transmitting a write signal, one of a drain electrode and a source electrode connected to a data line for transmitting a data voltage corresponding to luminance, and the other of the drain electrode and the source electrode connected to the gate electrode of the drive transistor; and a compensation transistor having a gate electrode connected to the data line, and at least one of a drain electrode and a source electrode connected to the write control line, the compensation transistor being of same conductivity type as the write transistor.

Advantageous Effects

According to the disclosed display device, the capacitance voltage dependence between the write control line and the data line decreases, and thus the difference of capacitance between the write control line and the data line caused by the difference in the data voltage transmitted by the data line becomes smaller. Accordingly, since the difference in the write signal waveforms when the luminance of the pixel circuit is high and when the luminance is low decreases, unevenness which is dependent on the luminance in an ON period in which the write transistor is in a conducting state decreases. By performing mobility correction in the ON period, the unevenness in the luminance dependence of mobility correction amount is reduced, and display device luminance unevenness caused by mobility correction amount inconsistency decreases. Since transistors of the same conductivity type are used for the write transistor and the compensation transistor, there is little concern that the manufacturing process will become complex.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT (Underlying Knowledge Forming the Basis of the Present Disclosure)

Before carrying out a detailed description of a display device according to an embodiment of the disclosure, the configuration of a typical display device assumed in the present disclosure and the luminance unevenness (particularly crosstalk) occurring in the display device will be described.

(Configuration of Typical Display Device)

Figure 1:
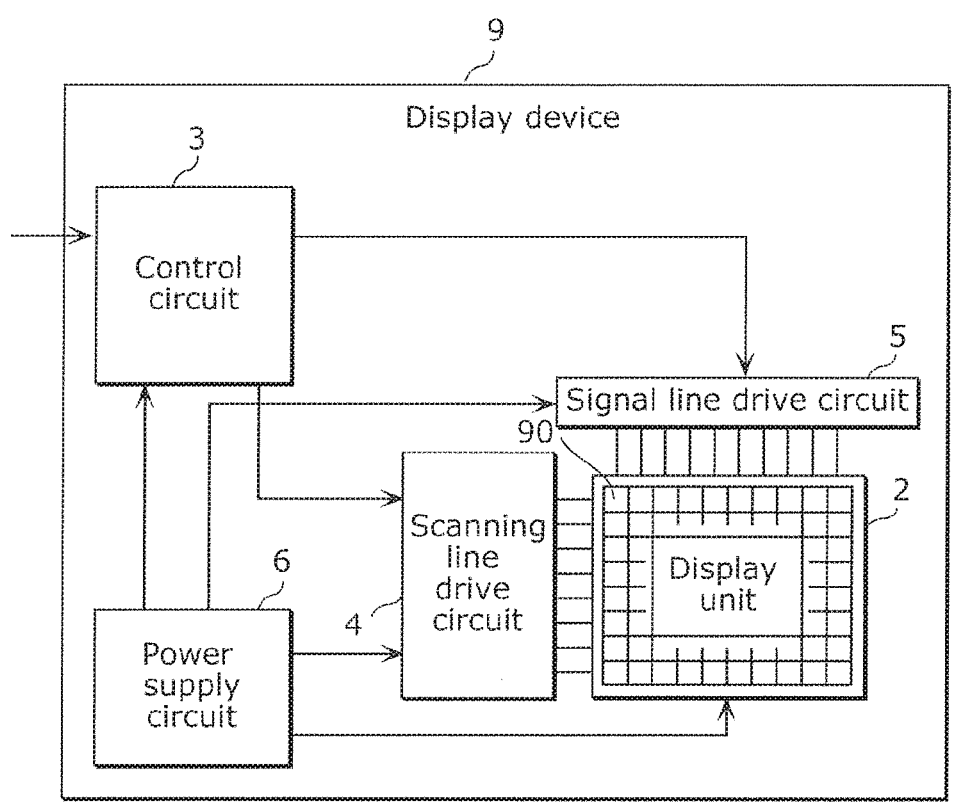
FIG. 1 is a function block diagram illustrating an example of a configuration of a typical display device.

FIG. 1 is a function block diagram illustrating an example of a configuration of a typical display device 9.

The display device 9 includes a display unit 2, a control circuit 3, a scanning line drive circuit 4, a signal line drive circuit 5, and a power supply circuit 6.

The display unit 2 includes a plurality of pixel circuits 90 which are arranged in a matrix. Each of rows in the matrix is provided with a scanning line connected in common to the pixel circuits 90 that are arranged in the same row, and each of the columns of the matrix is provided with a data signal line connected in common to the pixel circuits 90 that are arranged in the same column.

The control circuit 3 is a circuit that controls the operation of the display device 9, receives a video signal from an external source, and controls the scanning line drive circuit 4 and the signal line drive circuit 5 so that the image represented by the video signal is displayed by the display unit 2.

The scanning line drive circuit 4 supplies a control signal for controlling the operation of the pixel circuit 90, to the pixel circuit 90 via the scanning line.

The signal line drive circuit 5 supplies a data signal corresponding to the luminance, to the pixel circuit 90 via the data signal line.

The power supply circuit 6 supplies power for the operation of the display device 9, to the respective parts of the display device 9.

Figure 2:
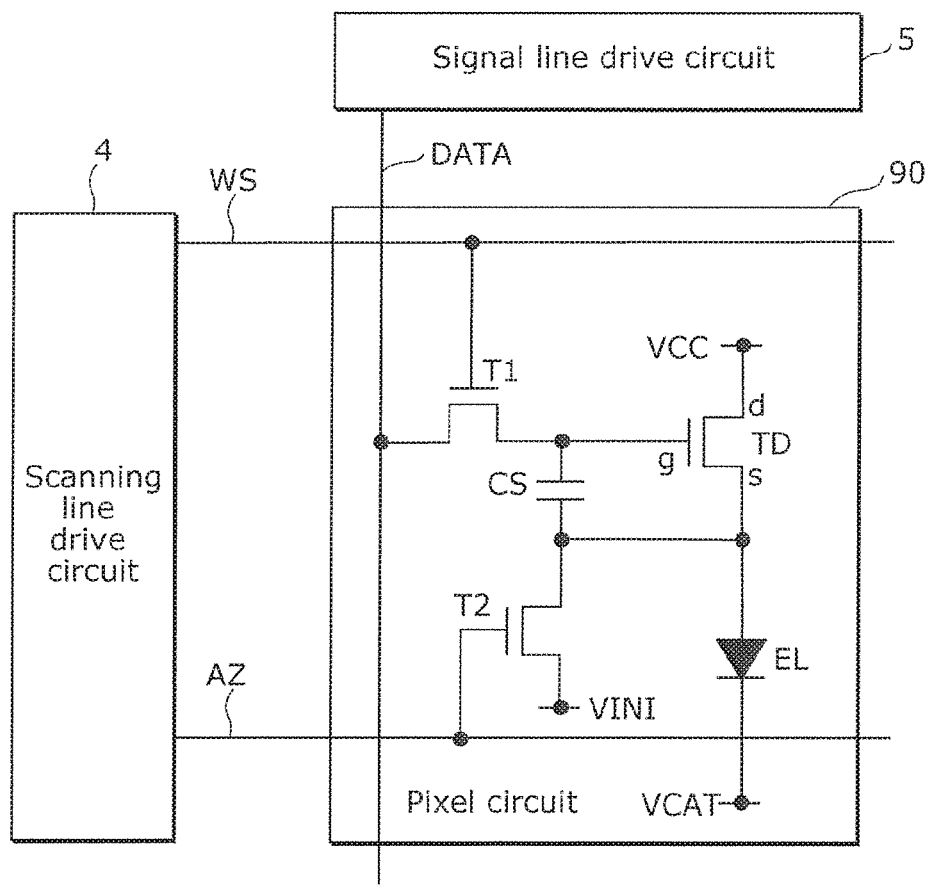
FIG. 2 is a circuit diagram illustrating an example of a configuration of a typical pixel circuit.

FIG. 2 is a circuit diagram illustrating an example of the configuration of a pixel circuit 90. FIG. 2 illustrates, in addition to the internal configuration of the pixel circuit 90, an example of the connection between the pixel circuit 90 and the scanning line drive circuit 4 and signal line drive circuit 5.

A signal line WS and a signal line AZ are provided, as scanning signal lines, in each of the rows of the display unit 2, and a signal line DATA is provided, as a data signal line, in each of the columns of the display unit 2. Here, the signal line WS and the signal line AZ are examples of a write control line and an initialization control line, respectively. The signal line DATA is an example of a data line.

Furthermore, display unit 2 is provided with a power supply line VCC and a power supply line VCAT for transmitting and distributing, to the pixel circuit 90, power supply voltage supplied from the power supply circuit 6; and an initialization voltage line VINI for transmitting and distributing, to the pixel circuit 90, a fixed initialization voltage supplied from power supply circuit 6. The power supply lines VCC and VCAT, and the initialization voltage line VINI are connected in common to all of the pixel circuits 90.

Each of the pixel circuits 90 arranged in the display unit 2 is connected to the scanning line drive circuit 4 by the signal lines WS and AZ of the row in which the pixel 90 is located, and is connected to the signal line drive circuit 5 by the signal line DATA of the row in which the pixel 90 is located.

The signal line WS transmit and the signal line AZ transmit a write signal and an initialization signal, respectively, for controlling the operation of the pixel circuit 90, from the scanning line drive circuit 4 to the pixel circuit 90. The signal line DATA transmits a data signal corresponding to luminance, from the signal line drive circuit 5 to the pixel circuit 90.

The pixel circuit 90 is a circuit that causes an organic EL element to emit light at a luminance corresponding to the data signal, and includes a drive transistor TD, a write transistor T1, an initialization transistor T2, a capacitor CS, and a light-emitting element EL. The light-emitting element EL is configured of an organic EL element.

The drive transistor TD has a drain electrode d connected to the power supply line VCC.

Capacitor CS has a first electrode (upper electrode in the figure) connected to a gate electrode g of the drive transistor TD, and a second electrode (lower electrode in the figure) connected to a source electrode s of the drive transistor TD.

The write transistor T1 switches between conduction and non-conduction between the gate electrode g of drive transistor TD and the signal line DATA, according to the write signal transmitted by the signal line WS.

The initialization transistor T2 switches between conduction and non-conduction between the source electrode s of drive transistor TD and the initialization voltage line VINI, according to the initialization signal transmitted by the signal line AZ.

The light-emitting element EL has a first electrode (upper electrode in the figure) connected to the source electrode s of the drive transistor TD, and a second electrode (lower electrode in the figure) connected to the power supply line VCAT, and is driven by the output current (drain-source current) of the drive transistor TD.

(Operation of a Typical Display Device)

Figure 3:
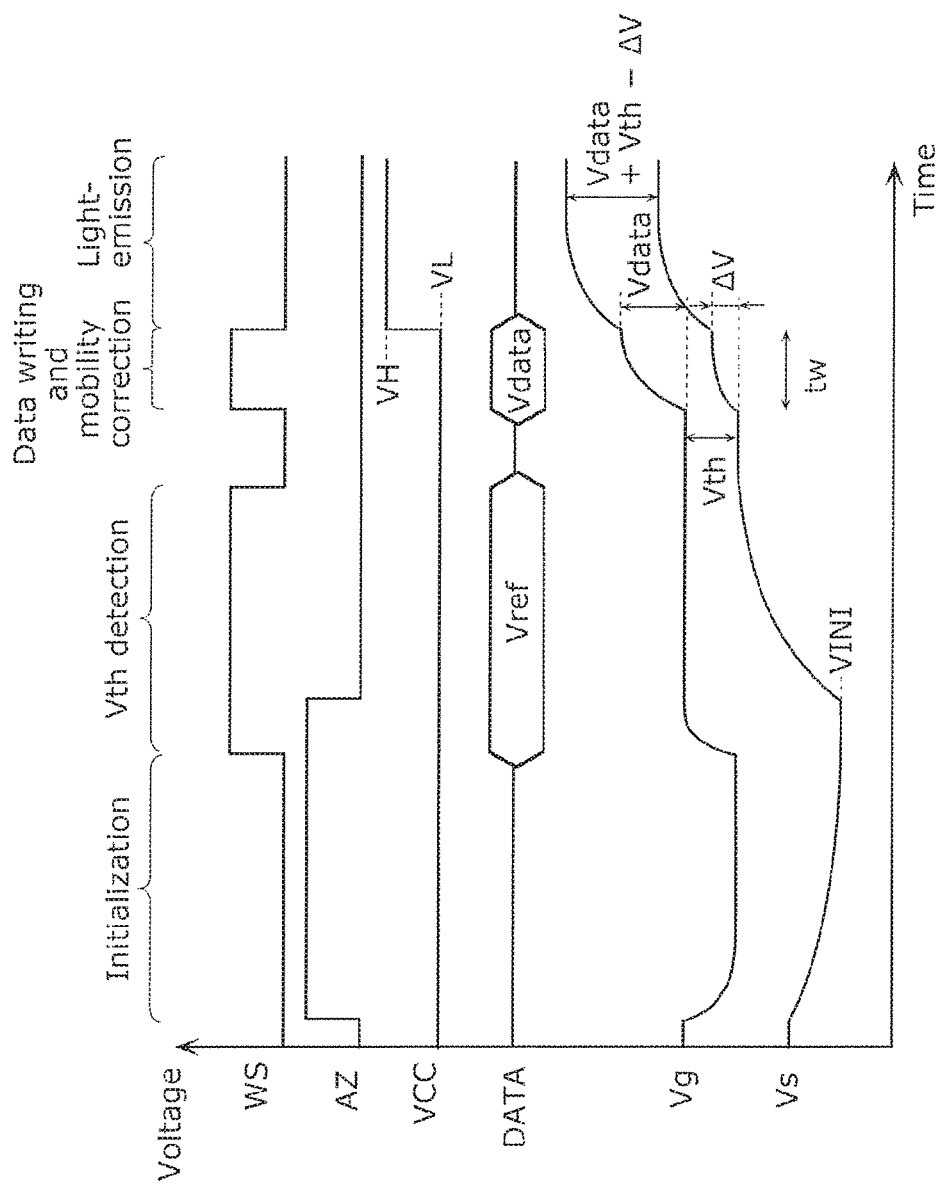
FIG. 3 is a signal waveform chart illustrating an example of operation of a typical pixel circuit.

FIG. 3 is a waveform chart illustrating an example of control signals, power supply voltages, and data signals for operating the pixel circuit 90. In FIG. 3, the vertical axis denotes the level of each signal, and the horizontal axis represents the passing of time. Furthermore, for the sake of brevity and clarity, the control signals, the data voltages, and the power supply voltages are given the same reference signs as the signal lines and power supply lines through which they are transmitted. Voltage Vg represents the voltage of the gate electrode g of the drive transistor TD, and voltage Vs represents the voltage of the source electrode s of the drive transistor TD.

In the example in FIG. 3, the write transistor T1 is placed in the conducting state and the non-conducting state in the periods in which the write signal WS is at a high level and a low level, respectively. Furthermore, the initialization transistor T2 is placed in the conducting state and the non-conducting state in the periods in which the initialization signal AZ is at a high level and a low level, respectively.

The fundamental operations of the pixel circuit 90 performed according to the control signals and data signals illustrated in FIG. 3 will be described.

In the initialization period, an initialization operation is performed.

Initialization signal AZ is set to the high level, and initialization voltage VINI is applied to the source electrode s of the drive transistor TD via the initialization transistor T2. Accordingly, source voltage Vs of drive transistor TD is initialized to initialization voltage VINI.

Power supply voltage VCC may be maintained at voltage VL (<VCAT+Vth (EL)) which is lower than a voltage obtained by adding light-emission start voltage Vth (EL) of light-emitting element EL to power supply voltage VCAT, from the initialization period and over the subsequent Vth detection period and data writing and mobility correction period. Accordingly, the light-emission of the light-emitting element EL can be inhibited, and thus display contrast deterioration and power consumption increase due to unnecessary light-emission by the light-emission element EL can be suppressed.

Next, in the Vth detection period, a Vth detection operation is performed.

Figure 4:
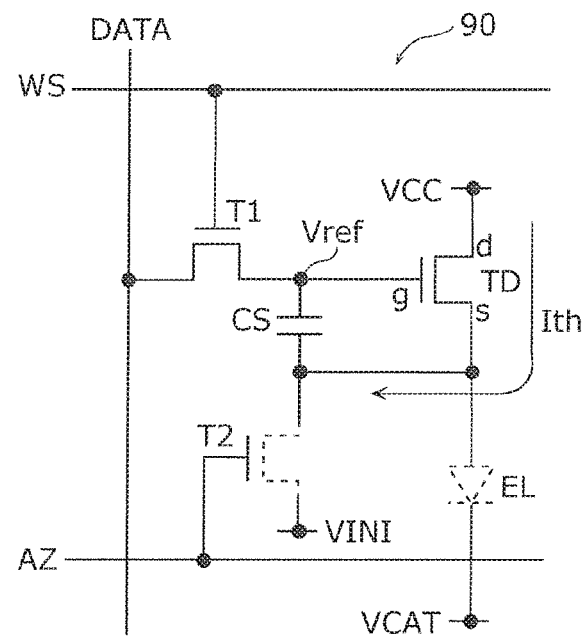
FIG. 4 is a circuit diagram illustrating an example of operation of a typical pixel circuit.

FIG. 4 is a circuit diagram for describing the operation of the pixel circuit 90 in the Vth detection period.

Data voltage DATA is set to reference voltage Vref and write signal WS is set to the high level, and thus reference voltage Vref is applied to the gate electrode g of the drive transistor TD via the write transistor T1. Furthermore, initialization signal AZ is set to the low level, and the application of initialization voltage VINI to the source electrode s of the drive transistor TD stops.

For the reference voltage Vref, a voltage Vref (>VINI+Vth) which is higher than a voltage obtained by adding, to initialization voltage VINI, the largest value of threshold voltage Vth of the drive transistors TD of all of the pixel circuits 90 of display unit 2. Accordingly, the drive transistor TD is placed in the conducting state, and drain-source current Ith flows.

Drain-source current Ith charges the capacitor CS, and the voltage of the second electrode of the capacitor CS, that is, source voltage Vs of the drive transistor TD rises from initialization voltage VINI. In addition, when source voltage Vs of the drive transistor TD rises up to voltage Vref−Vth, the drive transistor TD is placed in the non-conducting state and drain-source current Ith stops.

In this manner, source voltage Vs of the drive transistor TD converges to voltage Vref−Vth obtained by subtracting threshold voltage Vth from reference voltage Vref.

Next, in the data writing and mobility correction period, a data writing and mobility correction operation is performed.

Figure 5:
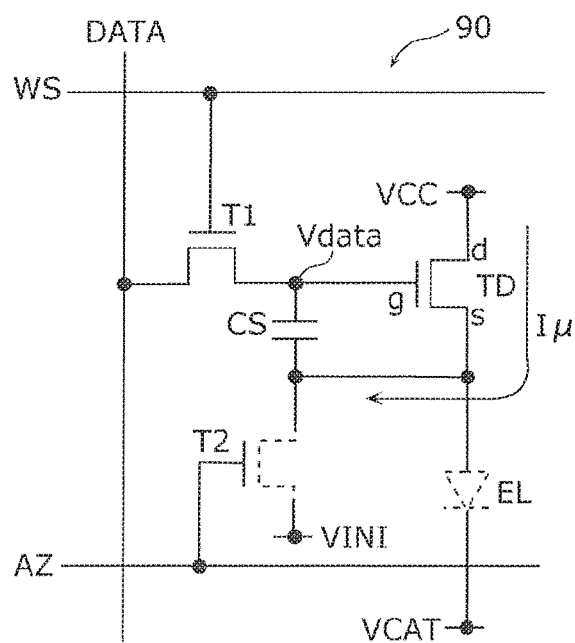
FIG. 5 is a circuit diagram illustrating an example of a configuration of a typical pixel circuit.

FIG. 5 is a circuit diagram for describing the operation of the pixel circuit 90 in the data writing and mobility correction period.

Data voltage DATA is set to voltage Vdata corresponding to the luminance at which the pixel circuit 90 is to be caused to emit light and write signal WS is set to the high level, and thus voltage Vdata is applied to the gate electrode g of the drive transistor TD.

At this time, since the gate-source voltage of the drive transistor TD is set to threshold voltage Vth in the preceding Vth detection period, drain-source current Ip immediately starts to flow in the drain transistor TD. The capacitor CS is charged by current Ip, and source voltage Vs of the drive transistor TD starts to rise toward voltage Vdata−Vth.

In the data writing and mobility correction period, gate voltage Vg of the drive transistor TD is set to voltage Vdata, and source voltage Vs rises by a voltage $\Delta V$ in accordance with current I$\mu$. Accordingly, the gate-source voltage of the drive transistor TD is set to voltage Vdata+Vth−$\Delta V$.

The bigger parameter $\beta$ of drive transistor TD is, the bigger current Ip becomes. Here, parameter $\beta$ is represented as $\beta=\mu \times Cox \times W/L$, where $\mu$ denotes mobility, Cox denotes gate insulating film capacitance per unit area, W denotes channel width, and L denotes channel length. By managing conducting time tw of the write transistor T1 to a constant length, parameter $\beta$ of drive transistor TD is reflected on voltage $\Delta V$ at a constant rate.

Subsequently, in the light emission period, a light-emitting operation is performed.

Power supply voltage VCC is set to voltage VH for causing drive transistor TD to operate in a saturation region. The drive transistor TD operating in the saturation region functions as a constant current source that passes drain-source current Ids represented by $\beta$ (Vgs−Vth) 2. Here, $\beta$ denotes the above-described parameter, Vgs denotes the gate-source voltage, and Vth denotes the threshold voltage.

Gate-source voltage Vgs of the drive transistor TD is set to voltage Vdata+Vth−$\Delta V$ in the preceding data writing and mobility correction period. As such, in the light-emission period, the drive transistor TD supplies drain-source current Ids represented by $\beta$ (Vdata−$\Delta V$) 2, to the light-emitting element EL.

Drain-source current Ids has no dependence on threshold voltage Vth, and since the term of (Vdata−$\Delta V$) decreases as parameter $\beta$ increases, dependence on parameter $\beta$ is small.

The light-emitting element EL, by being driven according to drain-source current Ids, emits light at a luminance obtained after correcting the error caused by threshold voltage Vth and parameter $\beta$ (including mobility $\mu$). In other words, the light-emitting element EL emits light at a luminance after Vth correction and mobility correction have been performed and which precisely corresponds to voltage Vdata.

According to display device 9, each of the pixel circuits 90 emit light at a precise luminance in accordance to the above-described operations, and thus reduction in luminance unevenness is expected.

(Luminance Unevenness in a Typical Display Device)

However, according to the configuration and operation of the pixel circuit 90, in actuality, there are instances where luminance unevenness occurs due to the parasitic capacitance of write transistor T1. Hereinafter, this luminance unevenness will be described.

Figure 6:
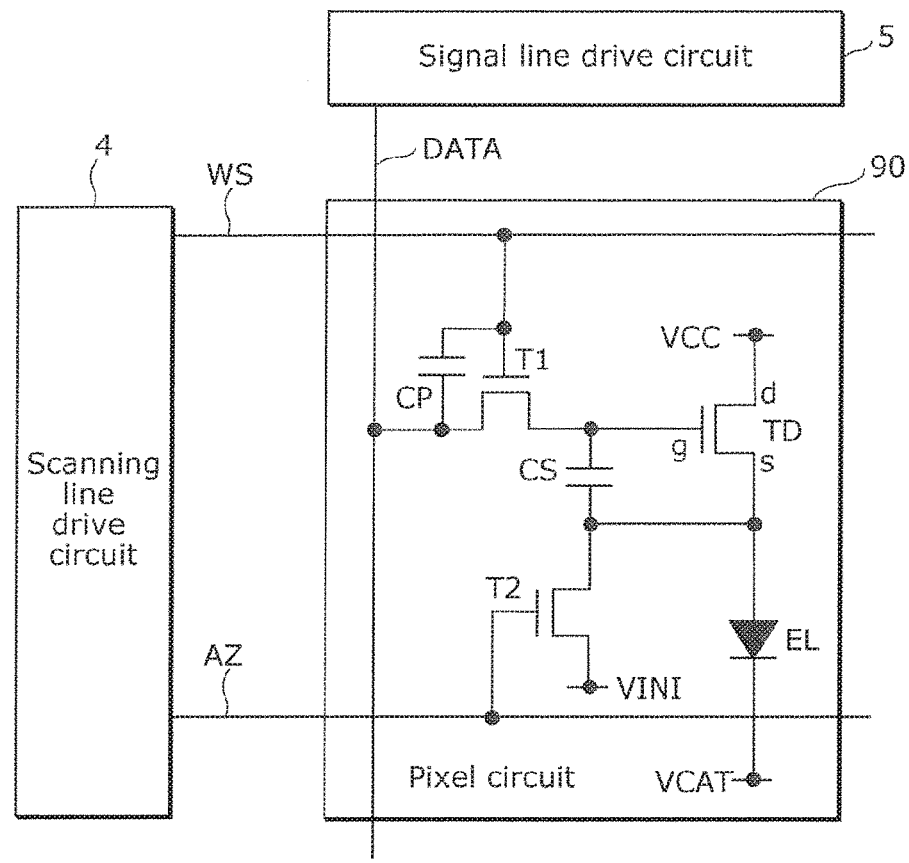
FIG. 6 is a circuit diagram illustrating a practical example of a configuration of a typical pixel circuit.

FIG. 6 is a circuit diagram illustrating an example of an actual configuration of the pixel circuit 90. In FIG. 6, parasitic capacitance CP of an actual write transistor T1 is clearly illustrated. The parasitic capacitance of the write transistor T1 is an MIS (metal-insulator-semiconductor) capacitance generated in an MIS structure including a gate electrode, a gate insulating film, and a channel semiconductor layer, and is voltage dependent.

Figure 7:
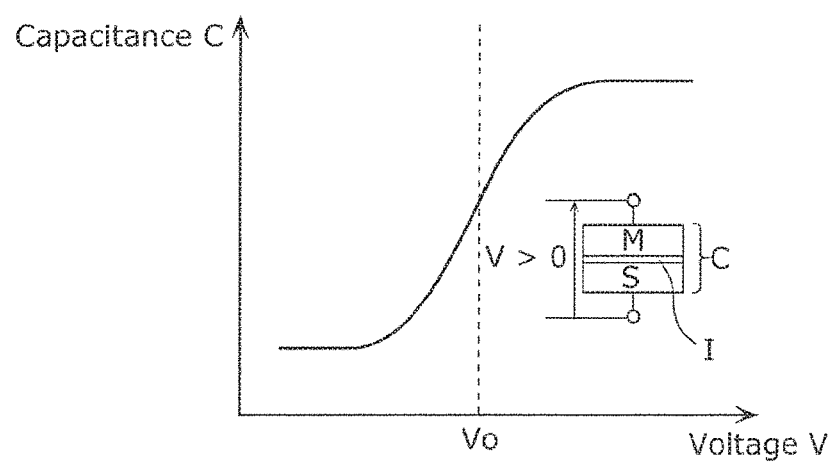
FIG. 7 is a graph illustrating an example of voltage dependence of MIS capacitance.

FIG. 7 is a graph illustrating an example of the voltage dependence of the MIS capacitance. As illustrated in FIG. 7, when positive voltage V is applied to a metal layer with the semiconductor layer as a reference, the MIS structure has MIS capacitance C which is dependent on the applied voltage. MIS capacitance C rapidly increases when the applied voltage V exceeds threshold voltage Vo.

Figure 8:
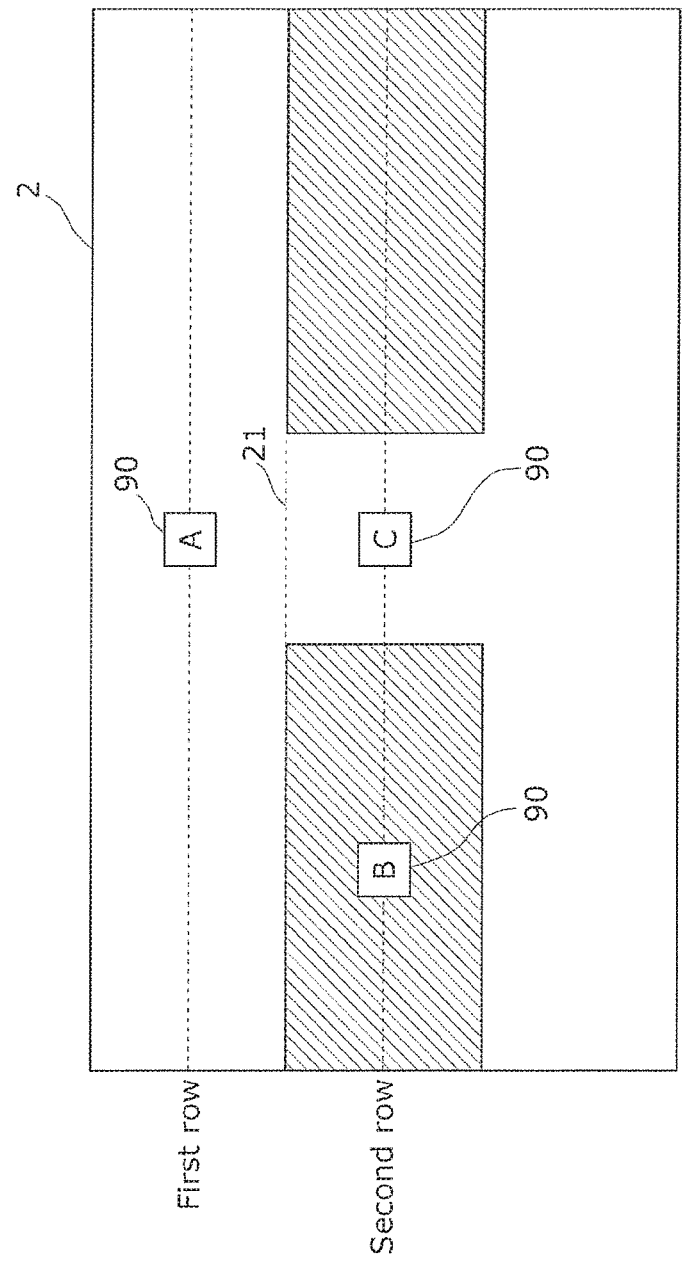
FIG. 8 is a diagram illustrating an example of an image in which luminance unevenness tends to occur.

FIG. 8 is a diagram illustrating an example of an image in which luminance unevenness (particularly crosstalk) tends to occur. When displaying the image, among the pixel circuits 90 included in the display unit 2: in a first row, all pixel circuits A emit light at a first luminance; in a second row, pixel circuits B, which are the majority, emit light at a second luminance lower than a first luminance and pixel circuits C, which are the minority, emit light at the first luminance. In the subsequent description, for the sake of brevity and clarity, the first luminance and the second luminance are referred to as high luminance and low luminance, respectively.

Figure 9:
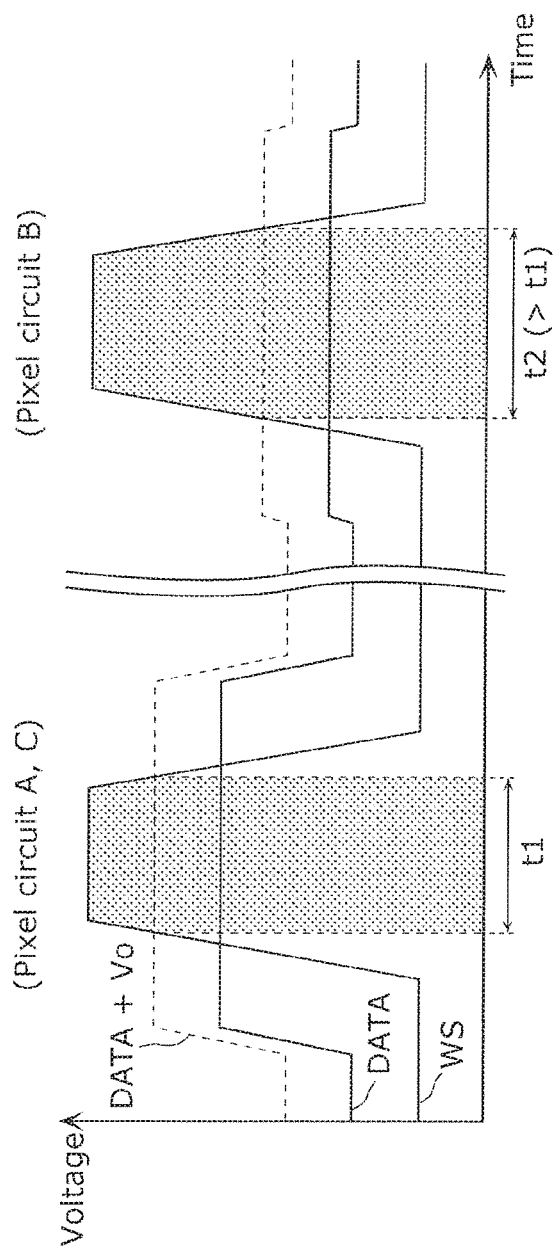
FIG. 9 is a signal waveform chart illustrating an example of operation of a typical pixel circuit.

FIG. 9 is a waveform chart illustrating an example of control signals and data signals involved in the operations of each of the pixel circuits A and C which emit light at the high luminance and the pixel circuits B which emit light at the low luminance, in the data writing and mobility correction period when displaying of the image illustrated in FIG. 8.

In FIG. 9, the amplitude of write signal WS is constant, and, in accordance with the luminance for the pixel circuits, data voltage DATA is high for the pixel circuits A and C, and low for the pixel circuits B. In order to understand the change in the parasitic capacitance of the write transistor T1, voltage DATA+Vo obtained by adding voltage Vo to data voltage DATA is shown. Based on the description for FIG. 7, in the periods (indicated by shading) where WS>DATA+Vo is satisfied, the write transistor T1 has a large parasitic capacitance compared to other periods.

As such, period t2 in which the write transistor T1 has a large parasitic capacitance in the pixel circuits B for which data voltage DATA is low is longer than period t1 in which the write transistor T1 has a large parasitic capacitance in the pixel circuits A and C for which data voltage DATA is high (t2>t1). In other words, in the entirety of the data writing and mobility correction period, the write transistor T1 has a larger parasitic capacitance in pixel circuits B compared to pixel circuits A and C.

As illustrated in FIG. 1, in each row, a predetermined number of the pixel circuits 90 are connected to the signal line WS of the row, and are controlled by write signal WS transmitted by the signal line WS. As such, the capacitance of signal line WS as seen from the scanning line drive circuit 4 is a capacitance obtained by multiplying the capacitance per pixel circuit 90 by the number of pixel circuits 90 disposed in one row, and thus an extremely big change may occur in the capacitance of signal line WS.

Specifically, the capacitance of signal line WS changes the most between the case where the average luminance of the pixel circuits 90 connected to the signal line WS is at maximum and the case where the average luminance is at minimum (for example, between the case where all the pixel circuits emit light at maximum luminance and the case where all the pixel circuits emit light at minimum luminance). As such, in accordance with the average luminance of the pixel circuits 90 connected to the signal line WS, a large difference is created in the waveform of write signal WS.

Figure 10:
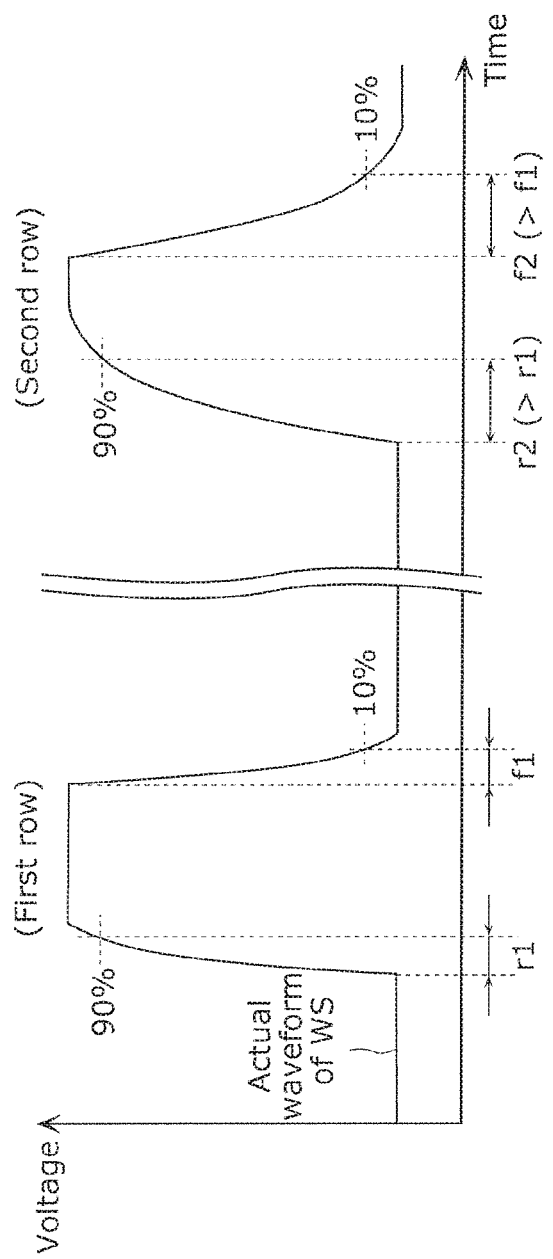
FIG. 10 is a waveform chart schematically illustrating an example of an actual waveform of a write signal.

FIG. 10 is a waveform chart schematically illustrating an example of an actual waveform of the write signal WS. Whereas the waveform rounding of write signal WS becomes smallest in the first row in which the average luminance of the pixel circuits 90 is at maximum, the waveform rounding of write signal WS is large in the second row in which the average luminance of the pixel circuits 90 is at maximum.

Specifically, waveform rounding may be quantified by the rise time and the fall time of the waveform. The rise time may be represented by the time it takes from when the signal starts to rise until 90% amplitude is reached (for example, r1 and r2 in FIG. 10), and the fall time is represented by the time it takes from when the signal starts to fall until 10% amplitude is reached (for example, f1 and f2 in FIG. 10).

The rise time is an index, the larger the value of which represents a larger amount of rounding, and, in the example in FIG. 10, r2>r1. Furthermore, the fall time is an index, the larger the value of which represents a larger amount of rounding, and, in the example in FIG. 10, f2>f1.

Although the luminance of both the pixel circuits A of row 1 and the pixel circuits C of row 2 is the same first luminance (high luminance), the pixel circuits A are controlled by write signal WS which has a small amount of waveform rounding, and the pixel circuits C are controlled by write signal WS which has a large amount of waveform rounding. As a result, between the pixel circuits A and the pixel circuits C, a difference arises in the conducting time tw of write transistor T1 and a difference arises in the correction amount regarding mobility μ (in a broader sense, parameter β), in the data writing and mobility correction period.

As such, without a countermeasure for reducing the unevenness in the average luminance dependence of the correction amount, there would arise, between the first row and the second row, a difference in the luminance that is actually produced by the pixel circuits A and C. Specifically, for example, it is possible to have image deterioration such as seeing border line 21 caused by the luminance difference between the first row and the second row. Such a luminance precision deterioration is luminance unevenness, that is, crosstalk, which occurs when the luminance of a pixel circuit is affected by the luminance of other pixel circuits.

As previously described, although PTL 1 cited in the Background section discloses a technique for reducing such crosstalk, there is a concern that the manufacturing process will be complex because a crosstalk cancel switch of a conductivity type different from that of the write transistor T1 is used. In view of this, the configuration of the display device to be described below is arrived at.

(Aspects of the Display Device to be Disclosed)

A display device according to an aspect of the present disclosure is a display device that includes a display unit including a plurality of pixel circuits, wherein each of the plurality of pixel circuits includes: a drive transistor; a capacitor connected to a gate electrode and a source electrode of the drive transistor; a light-emitting element which is driven by the drive transistor; a write transistor having a gate electrode connected to a write control line for transmitting a write signal, one of a drain electrode and a source electrode connected to a data line for transmitting a data voltage corresponding to luminance, and the other of the drain electrode and the source electrode connected to the gate electrode of the drive transistor; and a compensation transistor having a gate electrode connected to the data line, and at least one of a drain electrode and a source electrode connected to the write control line, the compensation transistor being of same conductivity type as the write transistor.

According to this configuration, the capacitance voltage dependence between the write control line and the data line decreases, and thus the difference in capacitance between the write control line and the data line caused by the difference in the data voltage transmitted by the data line becomes smaller. Accordingly, since the difference in the waveform of the write signals when the luminance of the pixel circuit is high and when it is low decreases, unevenness that is dependent on the luminance in an ON period in which the write transistor is in a conducting state decreases. By performing mobility correction in the ON period, the unevenness in the luminance dependence of mobility correction amount is reduced, and display device luminance unevenness caused by mobility correction amount inconsistency decreases.

Furthermore, transistors of the same conductivity type are used in the write transistor and the compensation transistor. Accordingly, since the compensation transistor can be manufactured using the manufacturing process of the write transistor without adding particular manufacturing processes, there is little concern about the manufacturing process becoming complex.

Furthermore, the write transistor and the compensation transistor may be metal-oxide semiconductor field-effect transistors having same channel length, same channel width, and same gate insulating film thickness.

According to this configuration, with the matching of these measurements of the write transistor and the compensation transistor, the characteristics of the parasitic capacitances with respect to gate-source voltage of both transistors can be made to match each other, and thus the luminance dependence of the capacitance present between the write control line and the data line can be precisely canceled out.

Furthermore, the write transistor and the compensation transistor may be metal-oxide semiconductor field-effect transistors having same gate electrode material, same gate insulating film material, and same channel semiconductor layer material.

According to this configuration, with the matching of these materials of the write transistor and the compensation transistor, the characteristics of the parasitic capacitances with respect to gate-source voltage of both transistors can be made to match each other, and thus the luminance dependence of the capacitance present between the write control line and the data line can be precisely canceled out.

Furthermore, a characteristic of a parasitic capacitance of the write transistor with respect to gate-source voltage and a characteristic of a parasitic capacitance of the compensation transistor with respect to gate-source voltage are mutually same.

According to this configuration, the best effect of cancelling out the voltage dependence of the capacitance between the write control line and the data line can be obtained.

Hereinafter, a display device according to an aspect of the present disclosure will be described with reference to the drawings.

It should be noted that the exemplary embodiment described below shows a specific example of the present disclosure. The numerical values, shapes, materials, structural elements, the arrangement and connection of the structural elements, etc. shown in the following exemplary embodiment are mere examples, and therefore do not limit the scope of the present invention. Furthermore, among the structural components in the following embodiments, components not recited in any one of the independent claims which indicate the broadest concepts are described as arbitrary structural components.

Embodiment

Compared to the typical display device 9 illustrated in FIG. 1, a display device according to an embodiment has the same general configuration, and is configured by replacing the respective pixel circuits 90 with pixel circuits 10 each of which includes a compensation transistor for canceling out the voltage dependence of the parasitic capacitance of the write transistor. Hereinafter, description of matter which is the same as in display device 9 are omitted as appropriate, and description is centered on matter that is characteristic to the pixel circuits 10 according to the embodiment.

Figure 11:
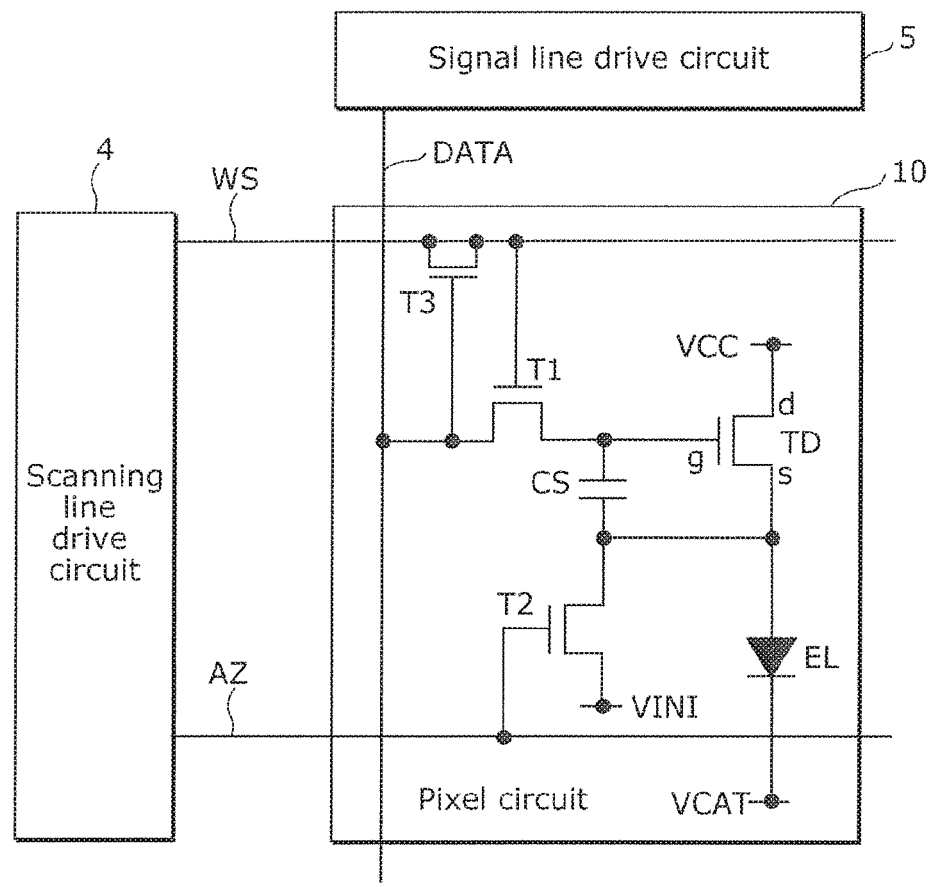
FIG. 11 is a circuit configuration diagram illustrating an example of a configuration of a pixel circuit according to an embodiment.

FIG. 11 is a circuit configuration diagram illustrating an example of a configuration of a pixel circuit 10 according to the embodiment. The pixel circuit 10 is configured by adding, to the pixel circuit 90 in FIG. 2, a compensation transistor T3 between the signal line DATA and the signal line WS, for canceling out the voltage dependence of the parasitic capacitance of the write transistor T1. Accordingly, the capacitance of the pixel circuit 10 between the signal line WS and the signal line DATA is composed of the parallel capacitance between the parasitic capacitance of the write transistor T1 and the parasitic capacitance of the compensation transistor T3.

The write transistor T1 and the compensation transistor T3 may be configured of metal-oxide semiconductor field-effect transistors (MOSFETs) of the same conductivity type.

In such case, the write transistor T1 is a first MOSFET having a gate electrode connected to the signal line WS, one of a drain electrode and a source electrode connected to the signal line DATA, and the other of the drain electrode and the source electrode connected to a gate electrode of a drive transistor TD. The compensation transistor T3 is a second MOSFET having a gate electrode connected to the signal line DATA, and a drain electrode and a source electrode connected to the signal line WS. It should be noted that since the compensation transistor T3 is to be used as a voltage-dependent capacitor, it is sufficient that at least one of the drain electrode and the source electrode of the compensation transistor T3 is connected to the signal line WS.

Figure 12:
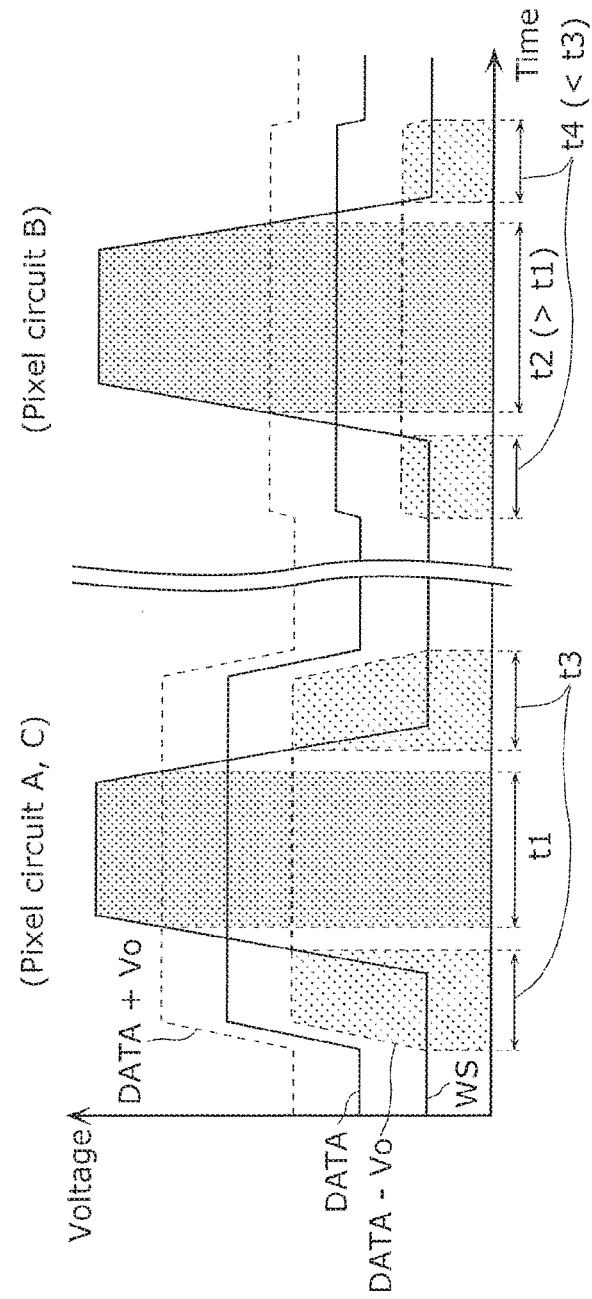
FIG. 12 is a signal waveform chart illustrating an example of operation of the pixel circuit according to the embodiment.

FIG. 12 is a waveform chart illustrating an example of control signals and data signals supplied to each of pixel circuits A and C and pixel circuits B in the data writing and mobility correction period when displaying of the image illustrated in FIG. 8. FIG. 12 is shown using the same labeling as in FIG. 9.

In order to understand the change in the parasitic capacitance of compensation transistor T3, FIG. 12 illustrates, in addition to the waveform illustrated in FIG. 9, voltage DATA−Vo obtained by subtracting voltage Vo from data voltage DATA. Based on the description in FIG. 12, in the periods (indicated by dark shading) where WS>DATA+Vo is satisfied, write transistor T1 has a large parasitic capacitance compared to other periods, and, in the periods (indicated by light shading) where WS<DATA−Vo is satisfied, compensation transistor T3 has a large parasitic capacitance compared to other periods.

As previously described, period t2 in which the write transistor T1 has a large parasitic capacitance in the pixel circuits B for which data voltage DATA is low is longer than period t1 in which the write transistor T1 has a large parasitic capacitance in the pixel circuits A and C for which data voltage DATA is high (t2>t1).

In contrast, period t4 in which the compensation transistor T3 has a large parasitic capacitance in the pixel circuits B for which data voltage DATA is low is shorter than period t3 in which the compensation transistor T3 has a large parasitic capacitance in the pixel circuits A and C for which data voltage DATA is high (t4<t3).

In this manner, the period in which the write transistor T1 has a large parasitic capacitance and the period in which the compensation transistor T3 has a large parasitic capacitance are complementary in the data writing and mobility correction period. As such, the luminance dependence unevenness in a period combining both aforementioned periods, that is, a period in which the capacitance between the signal line WS and the signal line DATA becomes large, decreases. Therefore, according to the pixel circuit 10, it is possible to reduce the unevenness of the luminance dependence of capacitance between the signal line WS and the signal line DATA in the entirety of the data writing and mobility correction period.

Because the unevenness of the luminance dependence of capacitance between the signal line WS and the signal line DATA is reduced in each of the pixel circuits 10, the unevenness of the luminance dependence of the capacitance of the signal line WS is effectively reduced. As such, in the display device (hereafter denoted as display device 1) using the pixel circuits 10, there is no big difference in the waveform of write signal WS even if the average luminance of the pixel circuits 10 connected to the signal wire WS is different.

Figure 13:
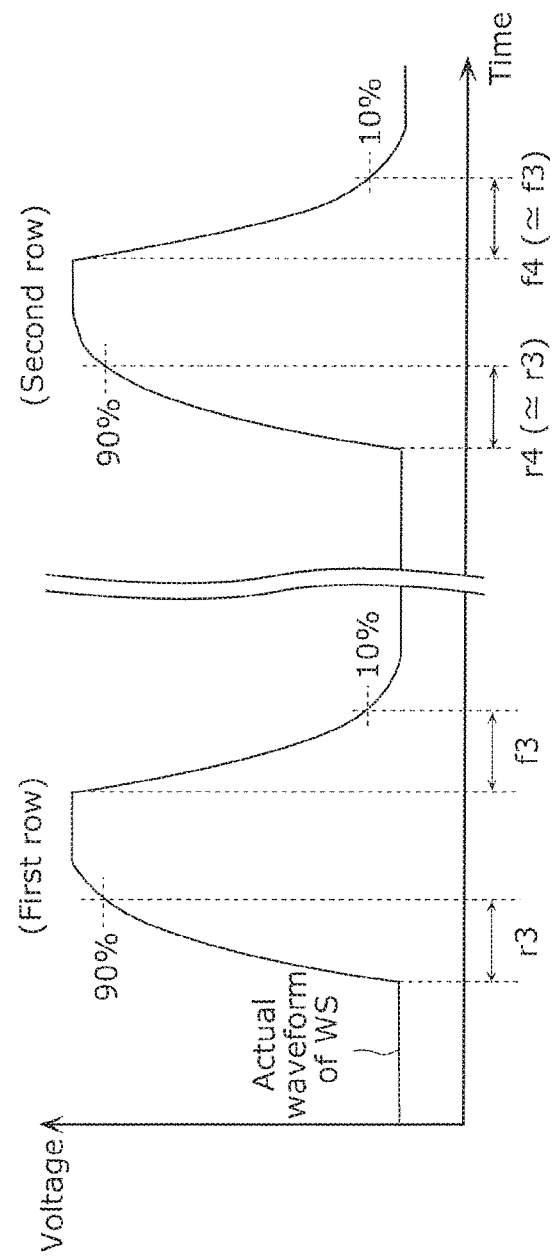
FIG. 13 is a waveform chart schematically illustrating an example of an actual waveform of a write signal according to the embodiment.

FIG. 13 is a waveform chart schematically illustrating an example of a waveform of the write signal WS. Approximately the same amount of waveform rounding occurs in write signal WS for both the first row in which the average luminance of the pixel circuits is high and the second row in which the average luminance of the pixel circuits 10 is low.

In the example in FIG. 13, rise time r3 of row 1 and rise time r4 of row 2 are approximately equal (r4≈r3), and fall time f3 of row 1 and fall time f4 of row 2 are approximately equal (f4≈f3).

It should be noted that the term approximately equal mentioned here means matching within a range of error that is defined as suitable in accordance with the required level for the luminance unevenness in the display device. For example, two time periods included within a ±10% range of the average value may be defined as equal.

In order to obtain a desirable luminance unevenness reducing effect, the rise time of write signal WS transmitted in signal line WS may be approximately equal between when the average luminance of the pixel circuits 10 connected to the signal line WS is at maximum and when it is at minimum. In addition, the fall time of write signal WS transmitted in signal line WS may be approximately equal between when the average luminance of the pixel circuits 10 connected to the signal line WS is at maximum and when it is at minimum.

By satisfying this condition, the waveform rounding of wire signal WS becomes approximately equal in the cases where the capacitance of the signal line WS can change the most, and thus the unevenness in the average luminance dependence of the mobility correction amount is most effectively reduced.

The aforementioned condition is realized by precisely canceling out the voltage dependence of the parasitic capacitance of the write transistor T1 for each of the pixel circuits 10. As such, for each of the pixel circuits 10, the compensation transistor T3 and the write transistor T1 may be provided with the same shape.

Figure 14:
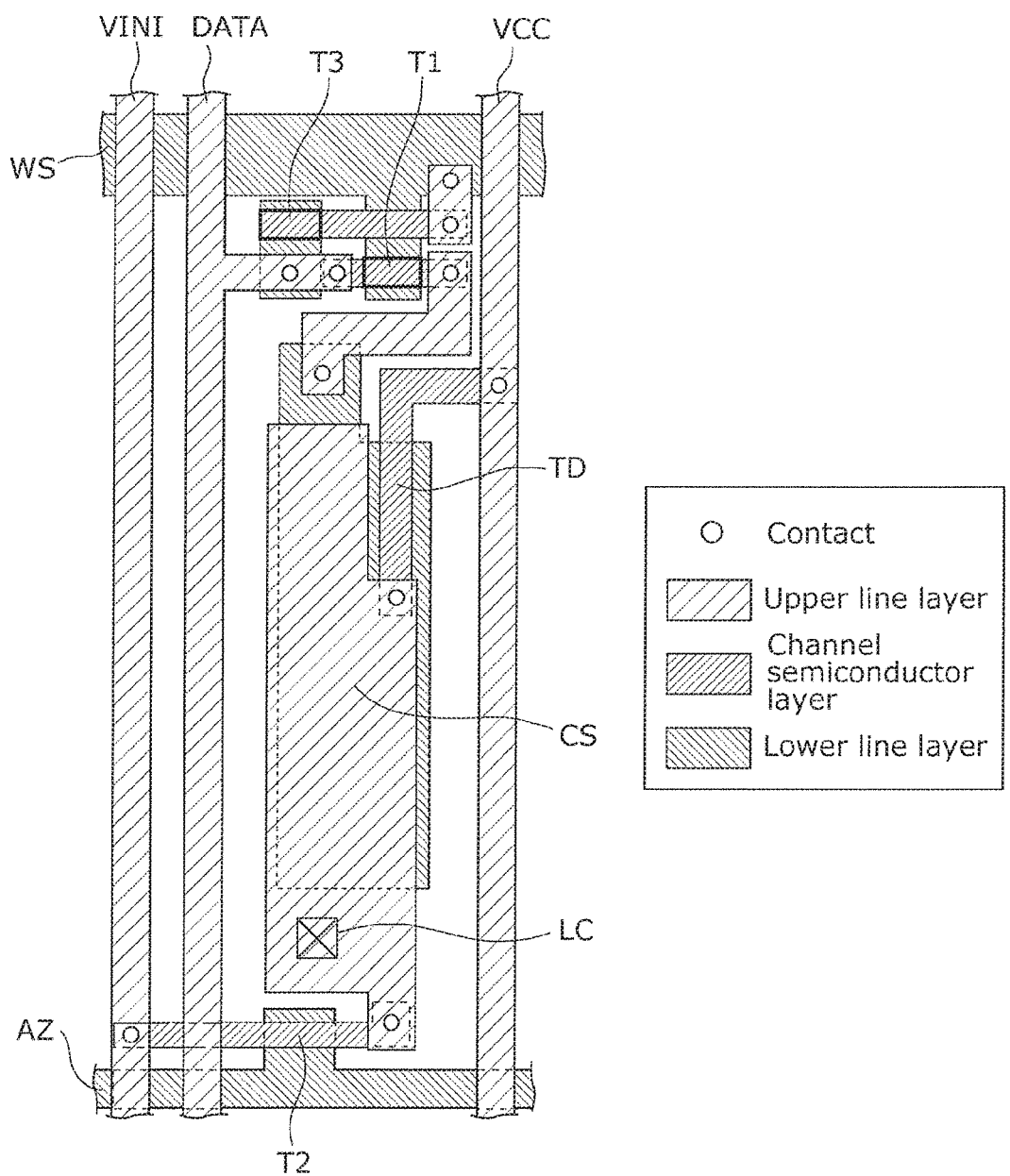
FIG. 14 is a plan view illustrating an example of a layout pattern of main parts of the pixel circuit according to the embodiment.

FIG. 14 is a plan view illustrating an example of a layout pattern of main parts of the pixel circuit 10. It should be noted that although the large contact LC illustrated in FIG. 14 is used for the connection of the light-emitting element EL, the light-emitting element EL and the power source line VCAT are omitted in FIG. 14.

As illustrated in FIG. 14, the channel region of the compensation transistor T3 and the channel region of the write transistor T1 may be provided to be of equal length and width. Furthermore, the gate insulating film of the compensation transistor T3 and the gate insulating film of the write transistor T1 may be provided to be of equal thickness.

In other words, the compensation transistor T3 and the write transistor T1 may be formed so that their respective channel lengths, channel widths, and gate insulation film thicknesses are of the same measurements. It should be noted that the measurements mentioned here refers to the design measurements, and actual measurements of the corresponding parts in the manufactured pixel circuit 10 may have an error of, for example, several percent.

Accordingly, with the matching of the measurements of the write transistor T1 and the compensation transistor T3, the characteristics of the parasitic capacitances with respect to the gate-source voltage of both transistors can be made to match each other, and thus the luminance dependence of the capacitance present between the signal line WS and the signal line DATA can be precisely canceled out.

Furthermore, the respective gate electrodes, gate insulating films, and channel semiconductor layers of the write transistor T1 and the compensation transistor T3 may be formed using the same materials.

Accordingly, with the matching of the materials of the write transistor T1 and the compensation transistor T3, the characteristics of the parasitic capacitances with respect to the gate-source voltage of both transistors can be made to match each other, and thus the luminance dependence of the capacitance present between the signal line WS and the signal line DATA can be precisely canceled out. In addition, since the compensation transistor T3 can be manufactured using the manufacturing process of the write transistor T1 without adding special materials or manufacturing processes, concerns over complicating the design stage and manufacturing stage of the pixel circuit 10 are reduced.

In this manner, by matching the characteristics of the parasitic capacitance with respect to gate-source voltage between the write transistor T1 and the compensation transistor T3 through the adoption of the same measurements and the same materials, it is possible to obtain the best effect of the canceling out of the voltage dependence of the capacitance between the signal line WS and the signal line DATA.

As described above, in the display device 1 using the pixel circuits 10, the luminance dependence (data voltage dependence) of the parasitic capacitance of the write transistor T1 is canceled out for each pixel circuit 10. Accordingly, the unevenness in the luminance dependence of the mobility correction amount is reduced, and it is possible to obtain the display device 1 in which luminance unevenness occurring due to mobility correction amount unevenness is reduced.

The display device 1 may be equipped inside a television receiver, for example.

Figure 15:
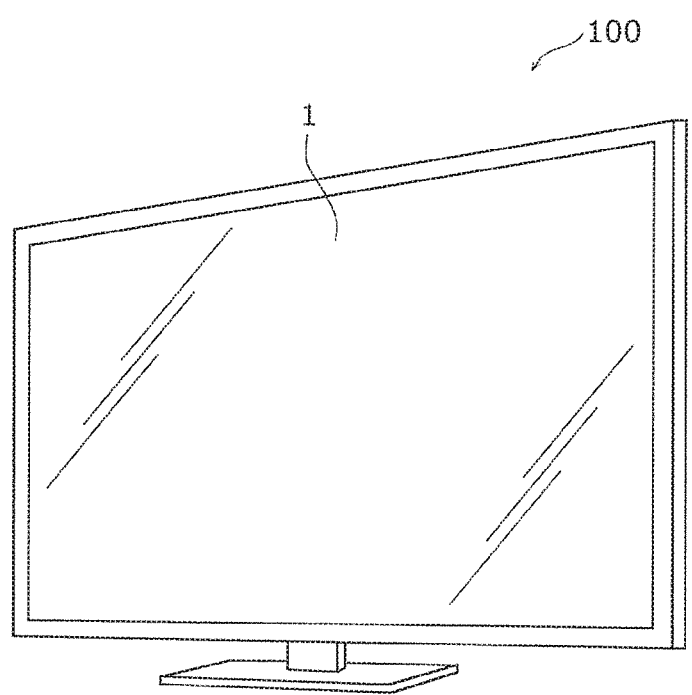
FIG. 15 is an external view illustrating an example of a thin flat-screen TV incorporating the display device according to the embodiment.

FIG. 15 is an external view illustrating an example of a thin flat-screen TV 100 incorporating the display device 1. The thin flat-screen TV 100 capable of precisely displaying video represented by a video signal without luminance unevenness is implemented by having the display device 1 built into the thin flat-screen TV 100.

Although a display device according to some aspects of the present disclosure are described based on an exemplary embodiment thus far, the present disclosure is not limited by this embodiment. Forms obtained by various modifications to the exemplary embodiments that can be conceived by a person of skill in the art as well as forms realized by combining structural components of different exemplary embodiments, which are within the scope of the essence of the present disclosure may be included in the scope of the present disclosure.

INDUSTRIAL APPLICABILITY

The present disclosure is useful in display device using organic EL elements, and is particularly useful in an active-matrix organic EL display device.

The invention claimed is:

1. A display device comprising a display unit including a plurality of pixel circuits,
wherein each of the plurality of pixel circuits includes:
a drive transistor having a gate electrode and a source electrode;
a capacitor connected to the gate electrode and the source electrode of the drive transistor;
a light-emitting element which is driven by the drive transistor;
a write transistor having a gate electrode connected to a write control line for transmitting a write signal, a drain electrode connected to a data line for transmitting a data voltage corresponding to luminance, and a source electrode connected to the gate electrode of the drive transistor; and
a compensation transistor having a gate electrode that is directly connected to the data line, and a pair of a drain electrode and a source electrode that are connected to the write control line, the compensation transistor being of same conductivity type as the write transistor.

2. The display device according to claim 1,
wherein the write transistor and the compensation transistor are metal-oxide semiconductor field-effect transistors having same channel length, same channel width, and same gate insulating film thickness.

3. The display device according to claim 1,
wherein the write transistor and the compensation transistor are metal-oxide semiconductor field-effect transistors having same gate electrode material, same gate insulating film material, and same channel semiconductor layer material.

4. The display device according to claim 1,
wherein a characteristic of a parasitic capacitance of the write transistor with respect to gate-source voltage and a characteristic of a parasitic capacitance of the compensation transistor with respect to the gate-source voltage are mutually the same.

5. A display device comprising a display unit including a plurality of pixel circuits,
wherein each of the plurality of pixel circuits includes:
a drive transistor having a gate electrode and a source electrode;
a capacitor connected to the gate electrode and the source electrode of the drive transistor;
a light-emitting element which is driven by the drive transistor;
a write transistor having a gate electrode connected to a write control line for transmitting a write signal, a source electrode connected to a data line for transmitting a data voltage corresponding to luminance, and a drain electrode connected to the gate electrode of the drive transistor; and
a compensation transistor having a gate electrode that is directly connected to the data line, and a pair of a drain electrode and a source electrode that are connected to the write control line, the compensation transistor being of same conductivity type as the write transistor.

6. The display device according to claim 5,
wherein the write transistor and the compensation transistor are metal-oxide semiconductor field-effect transistors having same channel length, same channel width, and same gate insulating film thickness.

7. The display device according to claim 5,
wherein the write transistor and the compensation transistor are metal-oxide semiconductor field-effect transistors having same gate electrode material, same gate insulating film material, and same channel semiconductor layer material.

8. The display device according to claim 5,
wherein a characteristic of a parasitic capacitance of the write transistor with respect to gate-source voltage and a characteristic of a parasitic capacitance of the compensation transistor with respect to the gate-source voltage are mutually the same.

* * * * *